United States Patent
Kim et al.

(10) Patent No.: US 11,386,292 B2
(45) Date of Patent: Jul. 12, 2022

(54) METHOD AND SYSTEM FOR AUTO MULTIPLE IMAGE CAPTIONING

(71) Applicant: Korea Electronics Technology Institute, Seongnam-si (KR)

(72) Inventors: Bo Eun Kim, Seoul (KR); Hye Dong Jung, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 44 days.

(21) Appl. No.: 17/016,654

(22) Filed: Sep. 10, 2020

(65) Prior Publication Data

US 2021/0117723 A1 Apr. 22, 2021

(30) Foreign Application Priority Data

Oct. 22, 2019 (KR) ........................ 10-2019-0131094

(51) Int. Cl.
*G06K 9/62* (2022.01)
*G06F 40/10* (2020.01)

(52) U.S. Cl.
CPC ........... *G06K 9/6256* (2013.01); *G06F 40/10* (2020.01); *G06K 9/6232* (2013.01); *G06K 9/6262* (2013.01)

(58) Field of Classification Search
CPC .. G06K 9/6256; G06K 9/6262; G06K 9/6232; G06K 9/00718; G06F 40/10; G06F 40/56; G06F 40/169; G06F 16/583; G06N 3/08

USPC ........................................................ 382/156
See application file for complete search history.

(56) References Cited

U.S. PATENT DOCUMENTS 10,949,717 B2 * 3/2021 van den Oord .......... G06N 3/04
2018/0124331 A1 * 5/2018 Min .................... G06K 9/00771

OTHER PUBLICATIONS

Devlin, Language models for image captioning: The quirks and what works. arXiv preprint arXiv:1505.01809, 2015. (Year: 2015).*
Farhadi, Every picture tells a story: Generating sentences from images. In ECCV, 2010. (Year: 2010).*
Kulkarni, Understanding and generating simple image descriptions. IEEE Transactions on Pattern Analysis and Machine Intelligence, 35(12):2891-2903, 2013. (Year: 2013).*
Kuznetsova, Generalizing image captions for image-text parallel corpus. In ACL, 2013. (Year: 2013).*

(Continued)

*Primary Examiner* — Juan A Torres
(74) *Attorney, Agent, or Firm* — Hauptman Ham, LLP (57) ABSTRACT

A method and a system for automatically generating multiple captions of an image are provided. A method for training an auto image caption generation model according to an embodiment of the present disclosure includes: generating a caption attention map by using an image; converting the generated caption attention map into a latent variable by projecting the caption attention map onto a latent space; deriving a guide map by using the latent variable; and training to generate captions of an image by using the guide map and the image. Accordingly, a plurality of captions describing various characteristics of an image and including various expressions can be automatically generated.

5 Claims, 6 Drawing Sheets

(56) References Cited

OTHER PUBLICATIONS

Mitchell, "Midge: Generating image descriptions from computer vision detections." In Proceedings of the 13th Conference of the European Chapter of the Association for Computational Linguistics, pp. 747-756. Association for Computational Linguistics, 2012 (Year: 2012).*

Liwei Wang et al., Diverse and Accurate Image Description Using a Variational Auto-Encoder with an Additive Gaussian Encoding Space, 31st Conference on Neural Information Processing Systems (NIPS 2017), Long Beach, CA, 11 Pages.

Korean Office Action dated Sep. 22, 2020, in connection with the Korean Patent Application No. 10-2019-0131094.

\* cited by examiner

METHOD AND SYSTEM FOR AUTO MULTIPLE IMAGE CAPTIONING

CROSS-REFERENCE TO RELATED APPLICATION(S) AND CLAIM OF PRIORITY

This application is based on and claims priority under 35 U.S.C. § 119 to Korean Patent Application No. 10-2019-0131094, filed on Oct. 22, 2019, in the Korean Intellectual Property Office, the disclosure of which is herein incorporated by reference in its entirety.

BACKGROUND

Field

The present disclosure relates generally to artificial intelligence (AI) technology, and more particularly, to a method and a system for automatically generating captions of an image by using an AI model.

Description of Related Art

Recently, technology for automatically generating an image caption by using AI technology emerges. This technology focuses on exactly generating one caption per image.

This technology aims at learning for the purpose of increasing accuracy of caption generation, and the same caption of a general and rough content may be frequently generated for similar images.

Accordingly, there is a limit to generating multiple captions including various expressions for one image, or generating multiple captions describing various characteristics of an image.

SUMMARY

To address the above-discussed deficiencies of the prior art, it is a primary object of the present disclosure to provide a method and a system for generating a plurality of captions describing various characteristics of an image and including various expressions.

According to an embodiment of the present disclosure to achieve the above-described object, a method for training an auto image caption generation model includes: generating a caption attention map by using an image; converting the generated caption attention map into a latent variable by projecting the caption attention map onto a latent space; deriving a guide map by using the latent variable; and training to generate captions of an image by using the guide map and the image.

The generating may include: inputting the image into a CNN and extracting image characteristics; generating a first map indicating a portion of the image that influences when a word is generated by using the extracted image characteristics, and a second map indicating a degree of influence of image information; and generating the caption attention map by obtaining a weighted sum of the first map and the second map.

The generating the first map and the second map may include inputting the extracted image characteristics into an RNN, and generating the first map and the second map.

The converting may include converting the caption attention map into the latent variable corresponding to a mean and a variance by letting the caption attention map pass through a layer.

A vector size of the latent variable may be settable, and a kind of the layer and a number of the layers may be settable.

The deriving may include: sampling the latent variable; and deriving the guide map by letting the sampled latent variable pass through a layer.

The sampling may include sampling the latent variable within a predetermined range from a mean, and a kind of the layer and a number of the layers may be settable.

The training may include: combining the image with the guide map; extracting characteristics of the image combined with the guide map; calculating a loss between a sentence derived from the extracted characteristics and a ground truth sentence; and training to reduce the loss.

The combining may include combining the image with the guide map by using concatenation or multiplication of matrixes.

According to another embodiment of the present disclosure, a system for automatically generating captions of an image includes: an acquisition unit configured to receive an image; and a processor configured to generate a caption attention map by using the image, to convert the generated caption attention map into a latent variable by projecting the caption attention map onto a latent space, to derive a guide map by using the latent variable, and to train to generate captions of the image by using the guide map and the image.

According to another embodiment of the present disclosure, a method for automatically generating captions of an image includes: sampling a latent variable in a latent space; deriving a guide map by letting the sampled latent variable pass through a layer; and inputting the guide map and an image into a trained AI model, and generating a caption.

According to another embodiment of the present disclosure, a system for automatically generating captions of an image includes: an acquisition unit configured to receive an image, and a processor configured to sample a latent variable in a latent space, to derive a guide map by letting the sampled latent variable pass through a layer, and to input the guide map and the image into a trained AI model, and to generate a caption.

According to embodiments of the present disclosure described above, a plurality of captions describing various characteristics of an image and including various expressions can be automatically generated.

In particular, the method and the system according to various embodiments of the present disclosure enable users to search images by using various expressions when searching a desired image or a portion of the image from many image (video) contents, and enable users to search images even when a content that a user wishes to search belongs to a portion of an image or is one of characteristics.

In addition, the method and the system according to various embodiments of the present disclosure can generate various different captions with respect to similar images when an image subtitle is generated or a context is explained to blind people, so that boring that a viewer may feel when the viewer continuously listens to or views the same explanation can be reduced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in detail with reference to the accompanying drawings.

Embodiments of the present disclosure suggest a method and a system for automatically generating multiple captions of an image by using a deep learning model, which can generate multiple captions describing various characteristics of an image and including various expressions.

The deep learning model used in embodiments of the present disclosure is a variational autoencoder (VAE)-based model. A basic structure of the VAE is suggested in FIG. 1.

Figure 1:
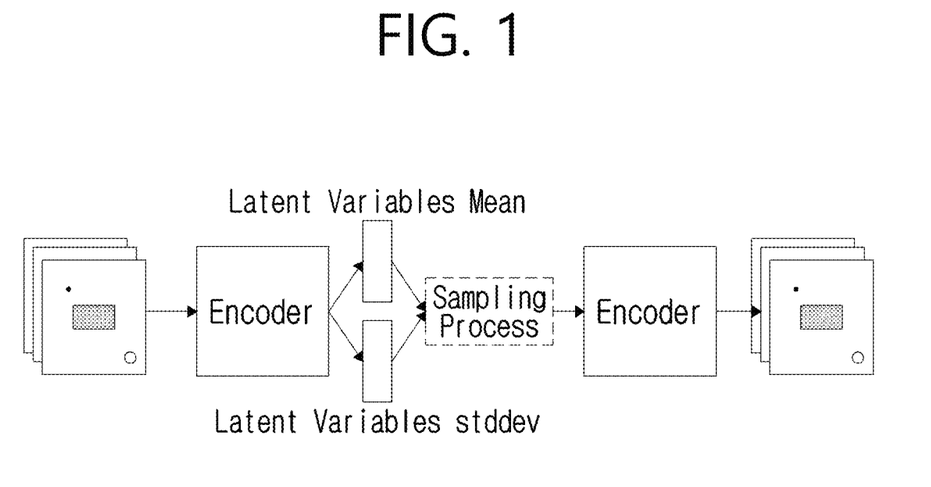
FIG. 1 is a view illustrating a basic structure of a variational autoencoder (VAE) used in an embodiment of the present disclosure.

In an embodiment of the present disclosure, a caption attention map (CAM) is projected onto an output of an encoder in the VAE structure, that is, onto a latent space, and, by doing so, randomness can be added to image area information when a sentence for a caption inference is generated, and sentences expressing more various characteristics of an image can be generated.

Figure 2:
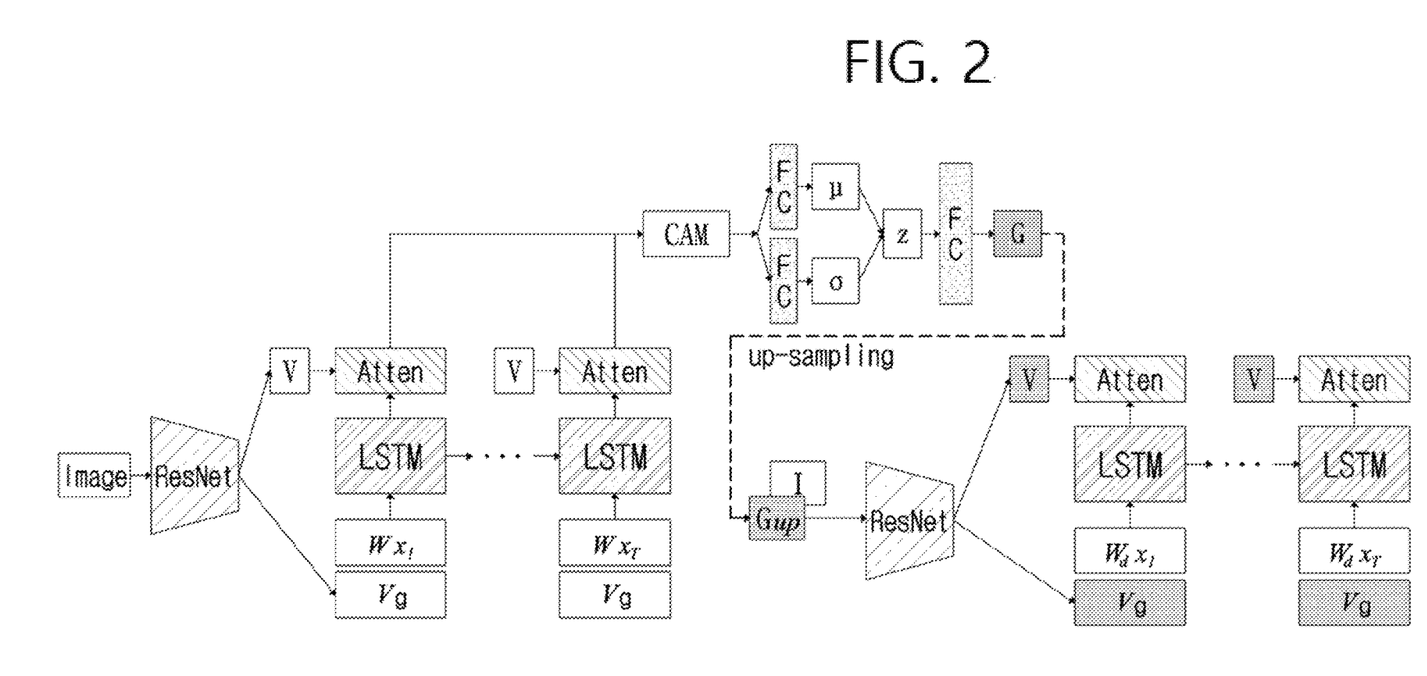
FIG. 2 is a view illustrating an overall structure of a deep learning model for generating multiple captions which is used in an embodiment of the present disclosure.
Figure 3:
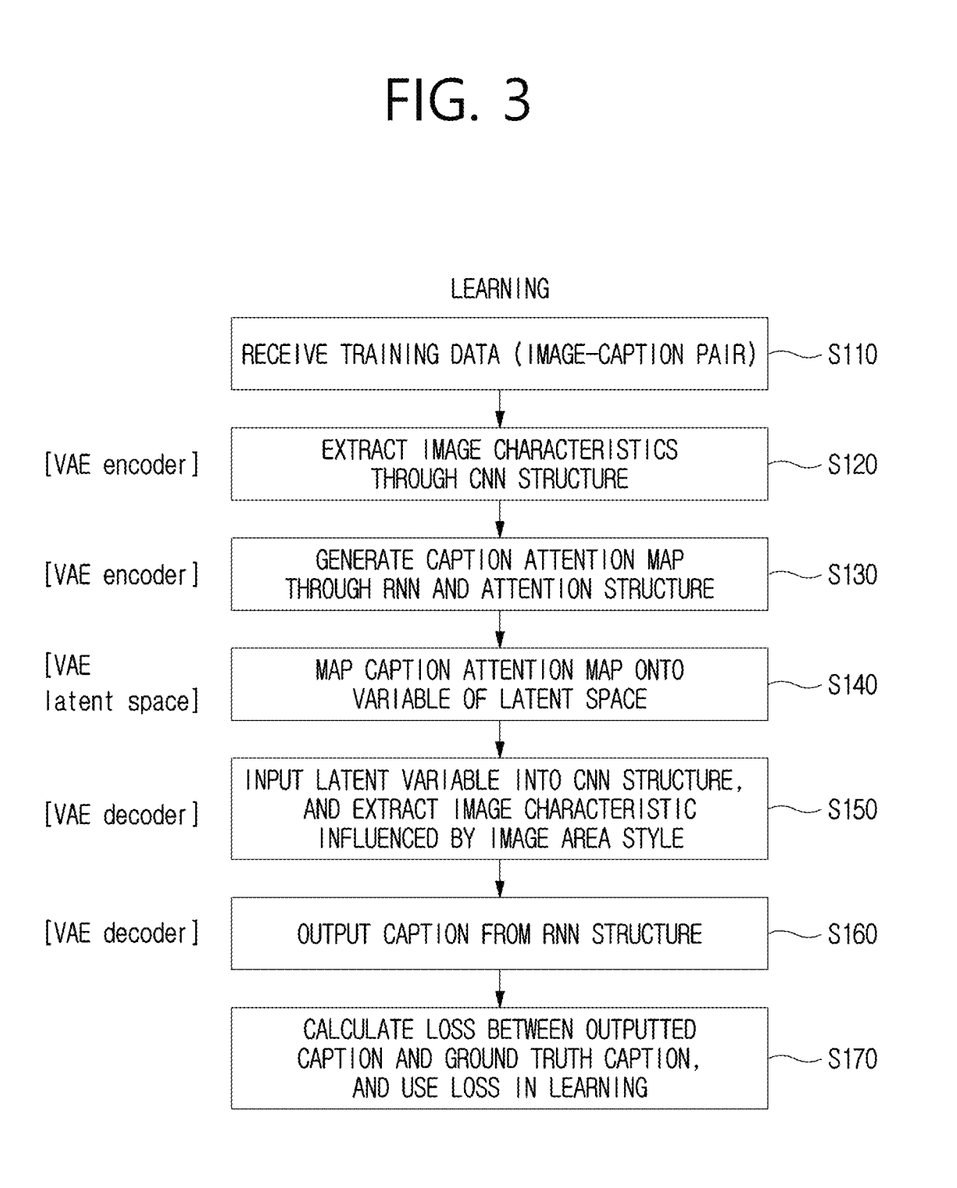
FIG. 3 is a flowchart illustrating steps of a learning process.

The whole structure of the deep learning model used in embodiments of the present disclosure, which performs the above-described function, is suggested in FIG. 2, and FIG. 3 illustrates a flowchart of steps of a learning process.

In the learning process, the encoder of the VAE receives training data (an image-caption pair) (S110), and generates a caption attention map by using an image.

Specifically, the encoder of the VAE inputs the image into a convolutional neural network (CNN) structure (ResNet, etc.), and extracts image characteristics (S120), and at each step of a recurrent neural network (RNN) structure used in the encoder, the image characteristics are received and the following two maps are generated, and then the caption attention map is generated by obtaining a weighted sum of the two maps (S130):

an area map (a) indicating which portion of an image influences when a word of a corresponding step is generated; and an influence map (113) indicating a degree of influence of image information when a word of a corresponding step is generated, $$CAM=[cam_1, \ldots, cam_k]$$

$$cam_i = \Sigma_{r=1}^{N} \alpha_{ri} *(1-\beta_r), f \text{ or } i \in [1,k]$$

(k is the number of divided image areas)

Figure 4:
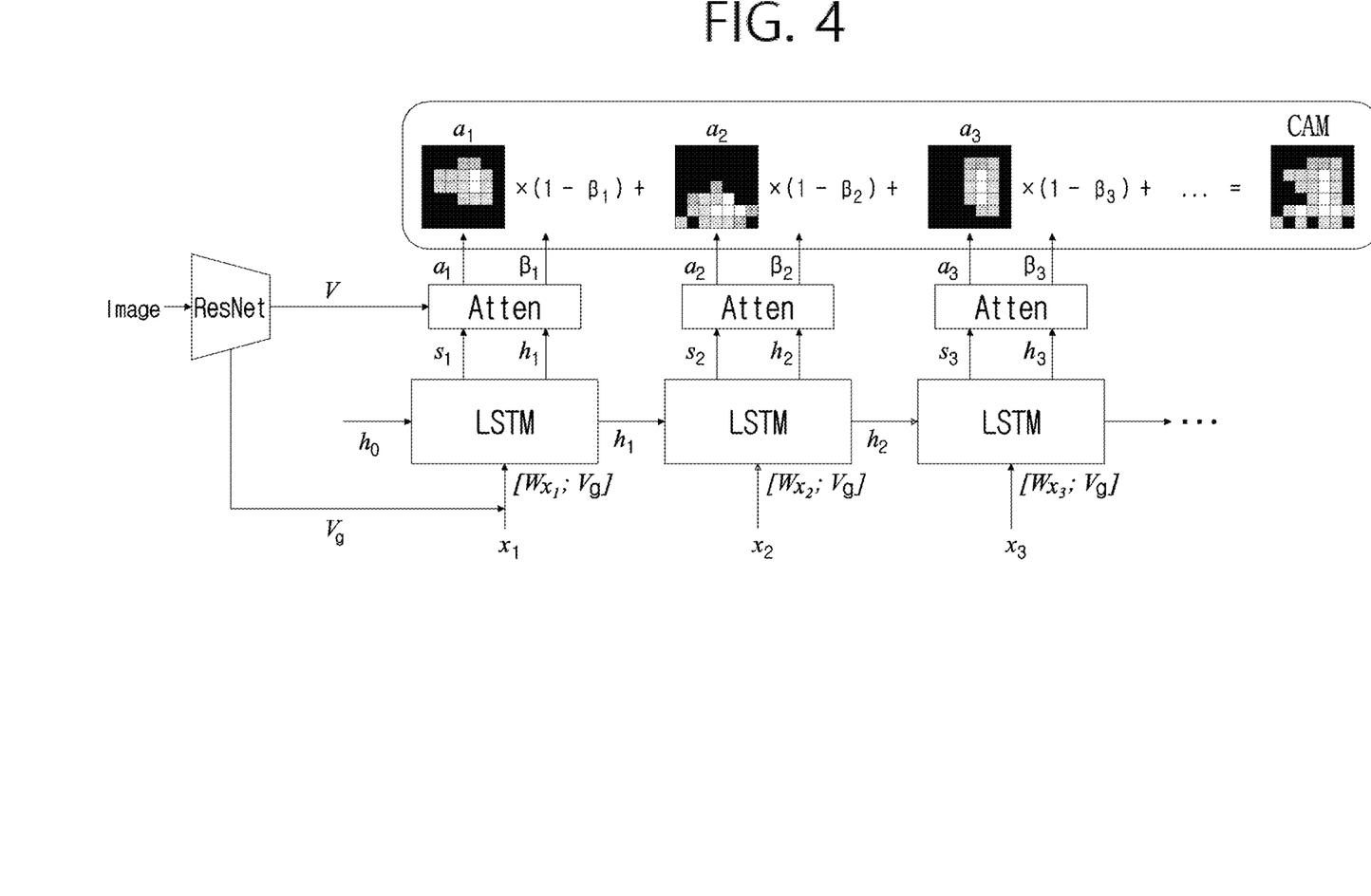
FIG. 4 is a view illustrating a method for generating a caption attention map.
Figure 5:
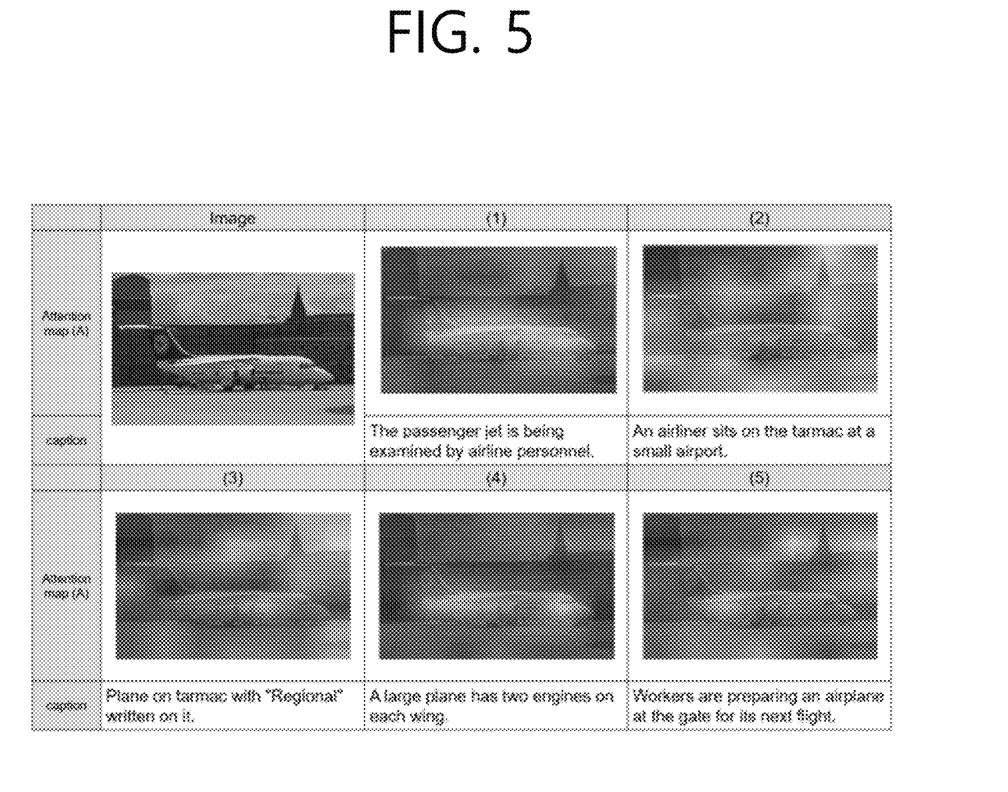
FIG. 5 is a view illustrating results of generating a caption attention map.

FIG. 4 illustrates a method for generating a caption attention map, and FIG. 5 illustrates results of generating a caption attention map.

Next, the caption attention map generated at step S130 is projected onto a latent space and is converted into a latent variable (S140). Specifically, the caption attention map is converted into the latent variable corresponding to a mean and a variance, by letting the caption attention map pass through a layer.

Herein, a vector size of the latent variable may be appropriately set according necessity and specifications, and a kind of the layer and the number of layers may be changed according to necessity and specifications.

Thereafter, the latent variable (z) is sampled in the latent space and a guide map G is derived by letting the sampled latent variable pass through a layer.

The latent variable (z) may be sampled close to the mean (within a predetermined range from the mean), and a kind of the layer for deriving the guide map and the number of layers may be changed according to necessity and specifications.

Next, a decoder of the VAE receives the guide map and the image and learns to generate captions of an image (S150-S170).

Specifically, in the learning process, the image is combined with the guide map, and the image combined with the guide map is inputted into the CNN and characteristics of the image influenced by image area information are extracted.

In addition, the image characteristics are inputted into the RNN structure as a condition and a sentence is derived, and learning is performed for the purpose of calculating a loss between a "ground truth sentence and a derived sentence" and reducing the loss.

Herein, a method for combining the guide map and the image may include various methods such as concatenation, multiplication of matrixes, etc.

Up to now, the process of training the deep learning model which can generate multiple captions describing various characteristics of an image and including various expressions has been described in detail.

Figure 6:
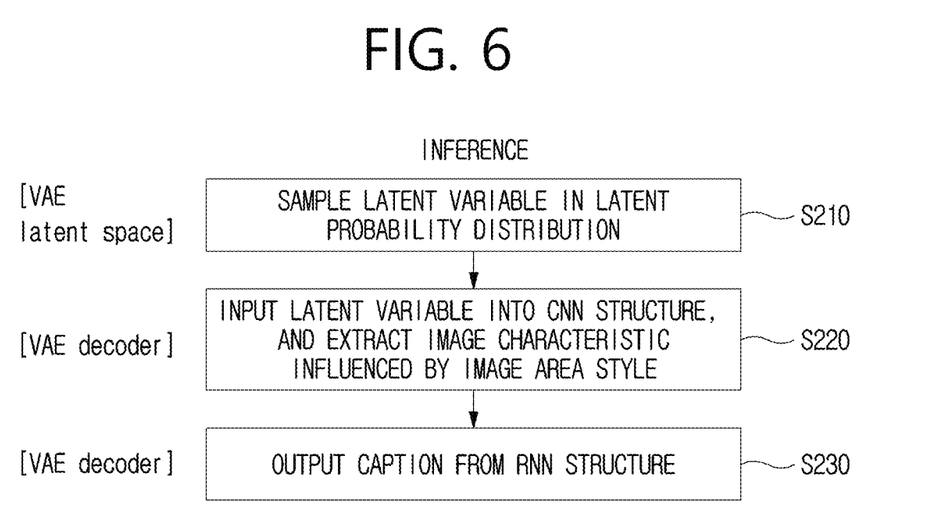
FIG. 6 is a flowchart illustrating steps of an inference process.

Hereinafter, a process of inferring a caption by using the trained deep learning model will be described in detail with reference to FIG. 6. FIG. 6 is a flowchart illustrating steps of the inference process.

In the inference process, a latent variable is sampled in a latent space, and a guide map is derived by letting the sampled latent variable pass through a layer (S210).

Specifically, the latent variable (z) is sampled according to a purpose, and, 1) when a variable far from the center of the latent space is sampled, a set of greatly different sentences may be generated, and, 2) when a variable close to the center of the latent space is sampled, a sentence of high accuracy may be generated.

Next, the decoder of the VAE receives the guide map and an image, and generates a sentence and outputs the sentence as a caption (S220-S230).

Specifically, the guide map and the image are combined with each other, and the image combined with the guide map is inputted into the CNN and characteristics of the image influenced by image area information are extracted. In addition, the image characteristics are inputted into the RNN structure as a condition and a sentence is derived.

Herein, a method for combining the guide map and the image may include various methods such as concatenation, multiplication of matrixes, etc.

Up to now, the method for generating multiple captions describing various characteristics of an image and including various expressions has been described in detail with reference to preferred embodiments.

The method for automatically generating multiple captions of an image according to an embodiment of the disclosure enables users to search images by using various expressions when searching a desired image or a portion of the image from many image (video) contents, and enables users to search images even when a content that a user wishes to search belongs to a portion of an image or is one of characteristics.

In addition, the method can generate various different captions with respect to similar images when an image subtitle is generated or a context is explained to blind people, so that boring that a viewer may feel when the viewer continuously listens to or views the same explanation can be reduced.

The method for automatically generating multiple captions of an image according to an embodiment can be applied to all of a still image, a recorded video, a video made in real time, or the like, and specific examples of the application fields are as follows:

(1) Sentence-based image search

A desired image or a portion of the image can be searched from many image/video clips through sentences (2) Vision information-based context explanation (2-1) Smart glasses for blind people (2-2) Explanation of a context of a side/rear during driving of a car (2-3) CCTV video-audio conversion for household/security (2-4) Auto generation of a video content subtitle (2-5) Summary of a video content (3) Image tagging (3-1) Auto generation of a large amount of image data sets (for example, a data set for a neural network)

(3-2) Auto generation of daily log (Auto saving of an explanation of a made video by using face recognition, metadata (gps, shooting time, etc.) information)

Figure 7:
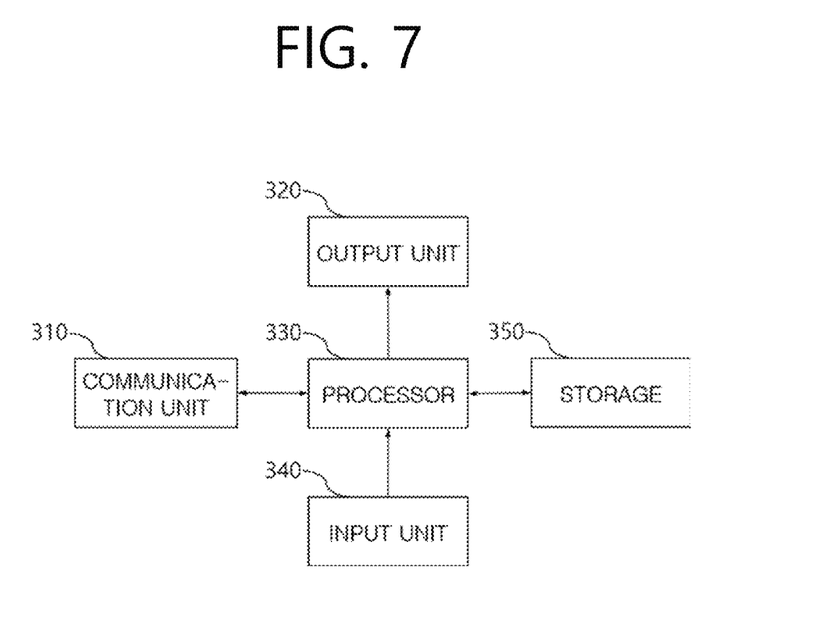
FIG. 7 is a block diagram of a system for automatically generating multiple captions of an image according to another embodiment of the present disclosure.

FIG. 7 is a block diagram of a system for automatically generating multiple captions of an image according to another embodiment of the disclosure.

The system for automatically generating multiple captions of an image according to another embodiment may be implemented by a computing system including a communication unit 310, an output unit 320, a processor 330, an input unit 340, and a storage 350 as shown in FIG. 7.

The communication unit 310 is a communication means for receiving training data, inference data from an external device and an external network. The input unit 340 is an input means for receiving a user command, and the output unit 320 is a display for displaying a process and a result of automatically generating multiple captions of an image.

The processor 330 may include a central processing unit (CPU) and a graphical process unit (GPU) for training the deep learning model for automatically generating multiple captions of an image described above, and automatically generating multiple captions by using the trained deep learning model.

The storage 350 provides a storage space necessary for operating the processor 330.

The technical idea of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for training an auto image caption generation model, the method comprising:

inputting an image into a convolutional neural network (CNN) and extracting first image characteristics of the inputted image;

inputting the first image characteristics into a recurrent neural network (RNN);

generating a first map indicating a portion of the image that influences when a word is generated by using the first image characteristics, and a second map indicating a degree of influence of image information on the portion of the image;

generating a caption attention map by obtaining a weighted sum of the first map and the second map;

converting the caption attention map into a latent variable corresponding to a mean and a variance by letting the caption attention map pass through a layer of a latent space;

sampling the latent variable and deriving a guide map by letting the sampled latent variable pass through the layer;

combining the image with the guide map;

inputting the combined image into the CNN and extracting second image characteristics of the combined image;

calculating a loss between a sentence derived from the extracted characteristics of the combined image and a ground truth sentence; and generating a caption of the image by using the calculated loss.

2. The method of claim 1, wherein a vector size of the latent variable is settable, and a kind of the layer and a number of the layers are settable.

3. The method of claim 1, wherein the sampling of the latent variable comprises sampling the latent variable within a predetermined range from a mean, and wherein a kind of the layer and a number of the layers are settable.

4. The method of claim 1, wherein the combining comprises combining the image with the guide map by using concatenation or multiplication of matrixes.

5. A system for automatically generating captions of an image, the system comprising:
   an acquisition unit configured to receive an image; and
   a processor configured to
      input an image into a convolutional neural network (CNN) and extract first image characteristics of the inputted image,
      input the first image characteristics into a recurrent neural network (RNN),
      generate a first map indicating a portion of the image that influences when a word is generated by using the first image characteristics, and a second map indicating a degree of influence of image information on the portion of the image,
      generate a caption attention map by obtaining a weighted sum of the first map and the second map,
      convert the caption attention map into a latent variable corresponding to a mean and a variance by letting the caption attention map pass through a layer of a latent space,
      sample the latent variable and derive a guide map by letting the sampled latent variable pass through the layer,
      combine the image with the guide map,
      input the combined image into the CNN and extract second image characteristics of the combined image,
      calculate a loss between a sentence derived from the extracted characteristics of the combined image and a ground truth sentence, and
      generate a caption of the image based on the calculated loss.

* * * * *